United States Patent [19]

Honacker et al.

[11] 4,152,183
[45] May 1, 1979

[54] METHOD FOR PRODUCING HOLLOW CYLINDRICAL STRUCTURES

[75] Inventors: Horst Honacker, Paradise Valley, Ariz.; James H. Sharpe, Orange, Calif.

[73] Assignee: Dart Industries, Inc., Los Angeles, Calif.

[21] Appl. No.: 816,009

[22] Filed: Jul. 15, 1977

Related U.S. Application Data

[63] Continuation-in-part of Ser. No. 759,322, Jan. 14, 1977, abandoned.

[51] Int. Cl.² ............................ B32B 5/18; B03C 3/40
[52] U.S. Cl. .......................................... 156/78; 55/101; 55/118; 138/109; 156/154; 156/215; 156/245; 264/45.7; 264/46.6; 264/162; 428/36; 428/192
[58] Field of Search .................. 156/78, 193, 267, 457, 156/215, 213, 425, 172, 173, 175, 154, 153, 298; 264/45.7, 45.3, 162, 271; 138/149, 150, 109, 108; 428/36, 35; 55/DIG. 38, 151, 101, DIG. 5

[56] References Cited

U.S. PATENT DOCUMENTS

| | | | |
|---|---|---|---|
| 2,558,855 | 7/1951 | Knewstubb et al. | 156/148 |
| 2,802,513 | 8/1957 | Stoeckel | 156/193 |
| 2,837,456 | 6/1958 | Parilla | 156/173 |
| 3,341,387 | 9/1967 | Boggs | 156/175 |
| 3,429,758 | 2/1969 | Young | 156/173 |
| 3,430,543 | 3/1969 | Cunningham | 156/195 |
| 3,522,122 | 7/1970 | De Ganahl | 156/171 |
| 3,598,275 | 8/1971 | Francois | 428/36 |
| 3,754,064 | 8/1973 | Snelling et al. | 156/78 |
| 3,793,802 | 2/1974 | Hardt | 55/DIG. 38 |
| 3,900,651 | 8/1975 | Hoppe et al. | 264/45.3 |
| 3,998,611 | 12/1976 | Honacker | 55/118 |
| 4,028,164 | 6/1977 | Moutaqut | 156/457 |

*Primary Examiner*—Michael W. Ball
*Attorney, Agent, or Firm*—John A. Robertson

[57] ABSTRACT

The disclosure relates to a method for producing hollow cylindrical structures, and more particularly for producing hollow cylindrical structures which may serve as collector electrodes for electrostatic precipitators; the method comprising the forming of a first resin and fiberous structural layer on a rotating mandrel, then applying a foam structure forming resin on the first structural layer, then permitting the foam structure to cure into a structural condition, then lathe turning the periphery of the foam structure to a uniform annular cylindrical surface, then applying a second layer of resin and fiberous material to form an external structural layer and then finishing the exterior of the last mentioned structural layer to a uniform annular shaped surface, and finally coating the last mentioned surface with a water resistent resinous material and then removing the glossy surface from said last mentioned material to prevent surface tension of water from separating flow on said last mentioned surface; the disclosure also relating to detailed instruction of the aforementioned fiberous structural layers.

4 Claims, 11 Drawing Figures

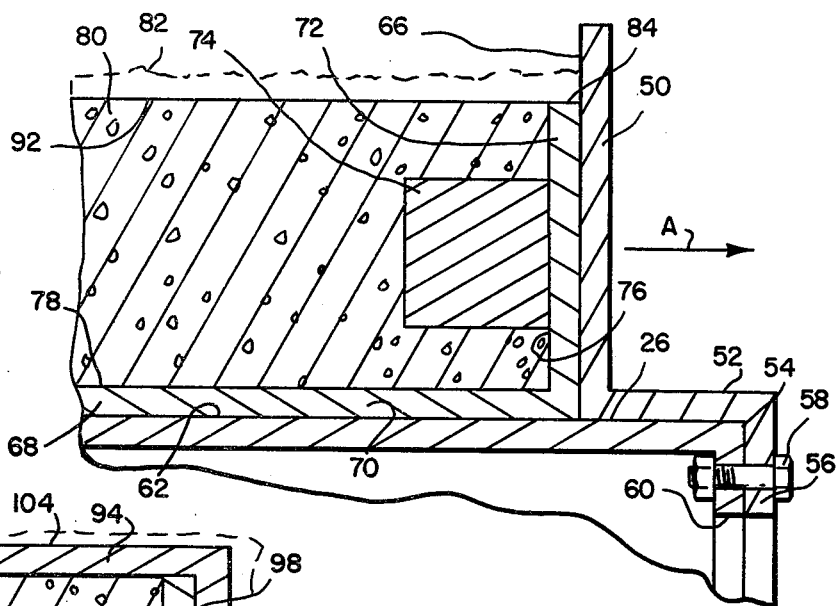
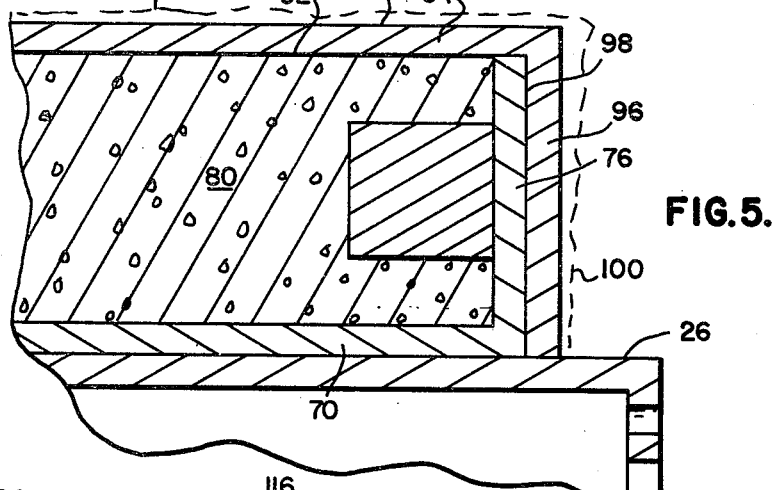
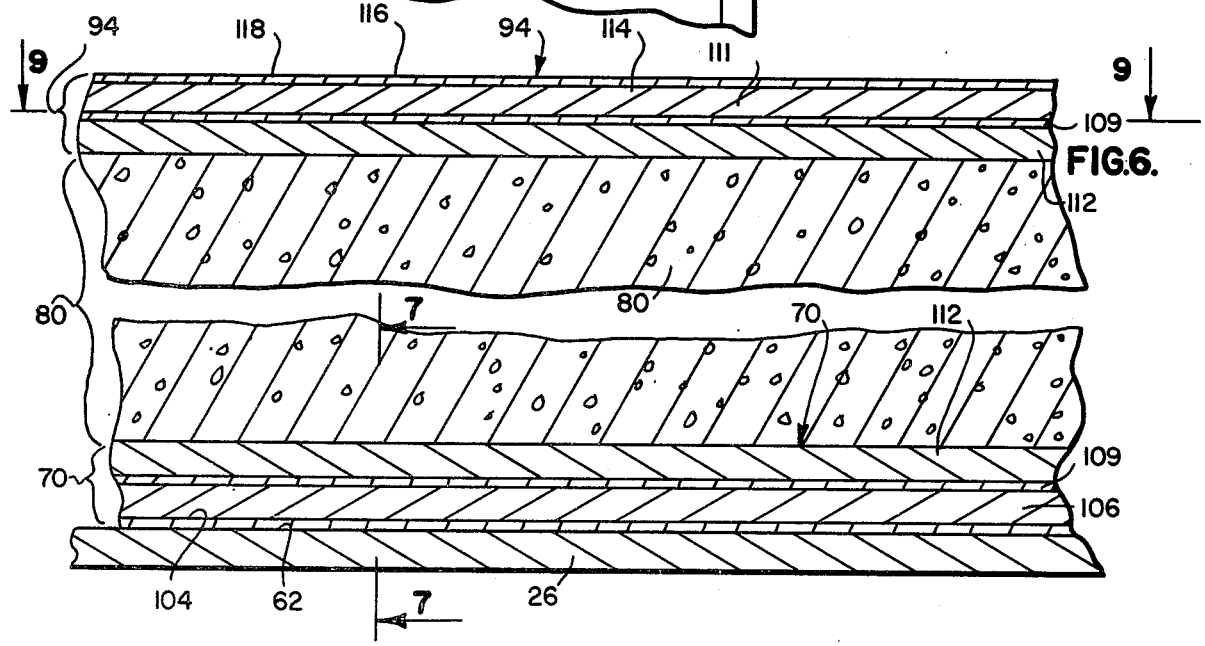

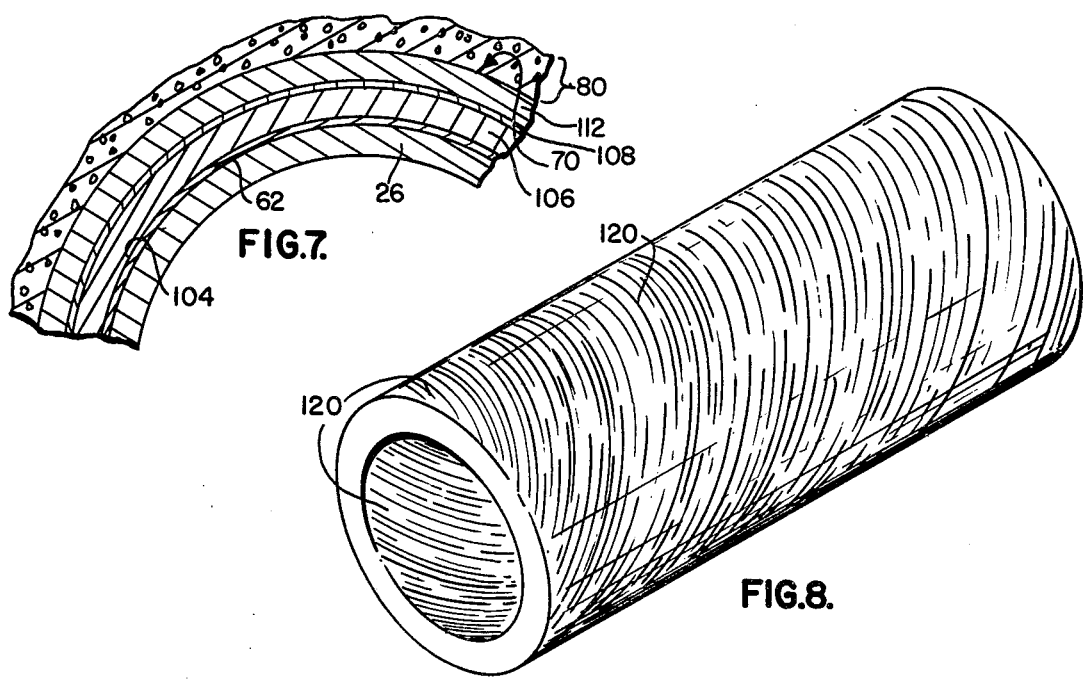
FIG.7.
FIG.8.
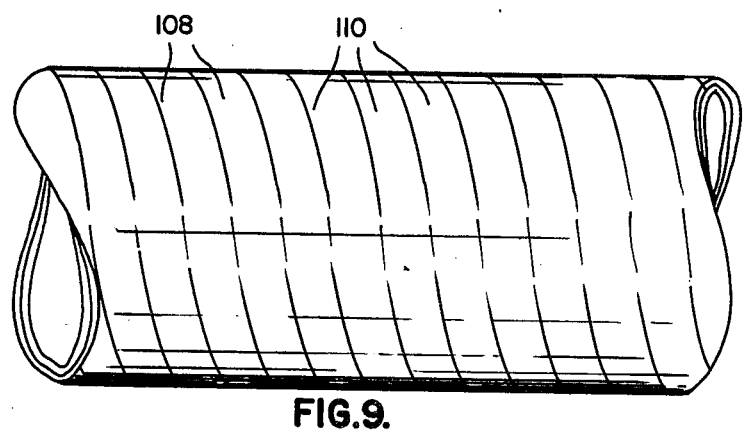
FIG.9.
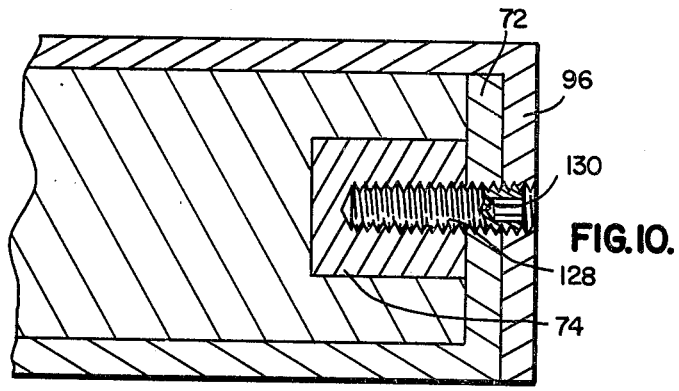
FIG.10.

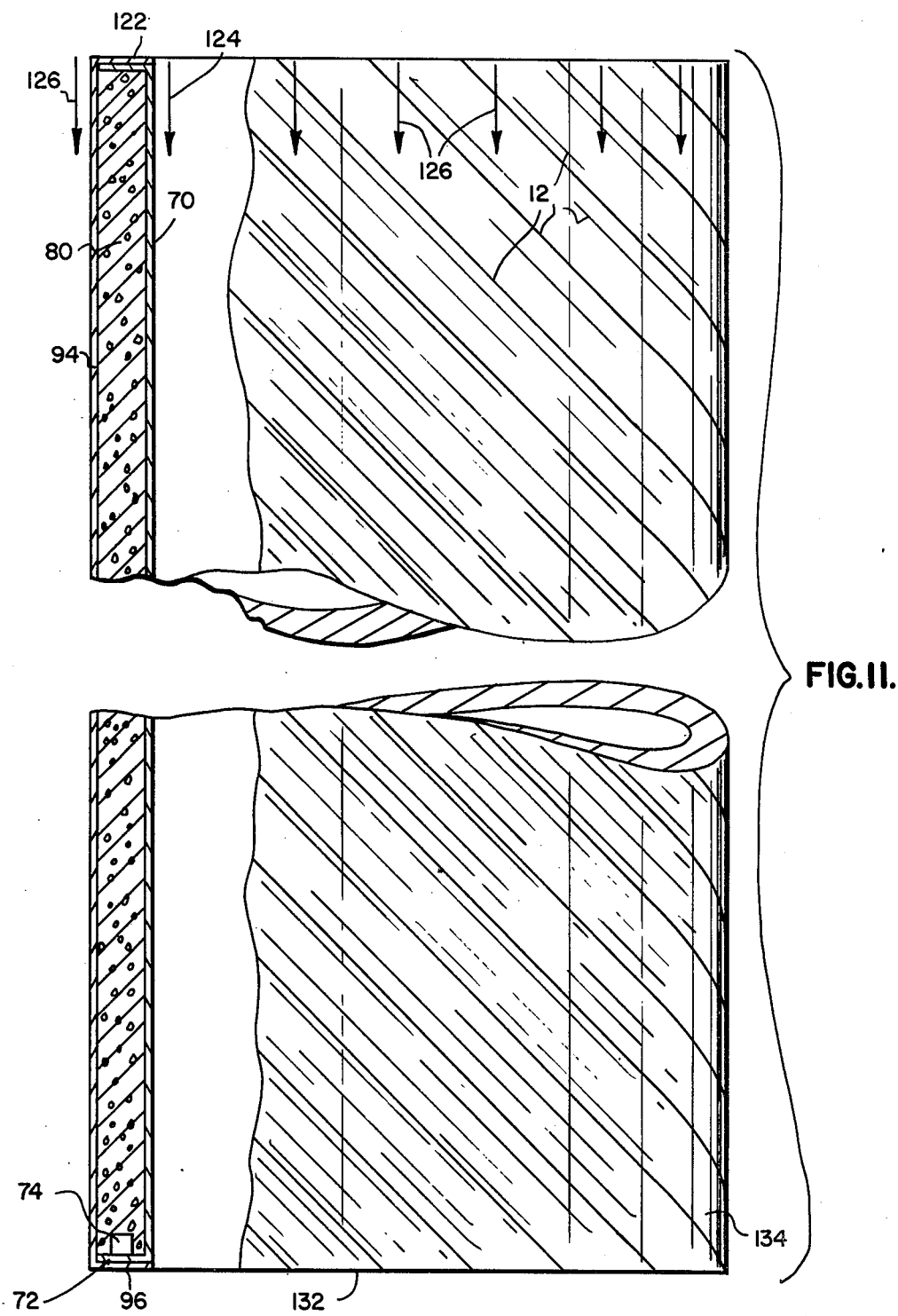

METHOD FOR PRODUCING HOLLOW CYLINDRICAL STRUCTURES

This application if a continuation-in-part of our co-pending application, Ser. No. 759,322, filed 1/14/77, now abandoned for Method for Producing Hollow Cylindrical Structures.

BACKGROUND OF THE INVENTION

Electrostatic precipitators have been utilized for removing undesirable foreign matter from the air, such matter as may be induced thereinto by various manufacturing processes which involve various noxious materials as well as fine physical particles. Collector electrodes for such electrostatic precipitators have heretofore been made of various materials and, due to the size of present day electrostatic precipitators, it has been a problem to produce efficient light weight cylindrical structures which are substantially rigid and accurate in annular cross section and which resist the environmental conditions of electrostatic precipitation of foreign matter from the air which may include various corrosive materials and other reactive materials. It has been found that some resin bonded structures are highly desirable for the purpose of constructing collector electrodes for electrostatic precipitators and these structures have been provided with spaced apart concentric annular walls which are connected together by light weight filler materials.

The various prior art methods of constructing such light weight hollow cylindrical collector electrodes have posed many problems relative to initial construction and also to durability and servicability of these electrode structures. Furthermore, the economy of producing such structures is of considerable importance.

SUMMARY OF THE INVENTION

The present invention relates to a method for producing hollow cylindrical structures as well as to the structures which are a product of the method; the method being particularly adapted for producing hollow cylindrical collector electrodes for electrostatic precipitators. The method of the invention comprises the forming of such hollow cylindrical structures on rotating mandrels which are related to lathe turning operations. The mandrels usable to carry out the method are diametrically collapsible and have removeable or moveable end flanges relative to which the method of the invention may be carried out. In accordance with the method of the invention, the foregoing rotatable mandrel and its end flanges which extend radially therefrom provide a means upon which a first resin and fiberous structural layer may be produced by placing fiberous material, such as fiber glass, and resin thereon. A foam structure forming resin is then placed on the first resinous and fiberous layer so formed and the structure forming resin is allowed to cure and bond to the first resin and fiberous structural layer and to form a relatively rigid foam structure. The periphery of the foam structure is then lathe turned to provide a smooth uniform annular shaped surface upon which a second resin and fiberous structural layer is bonded and the second fiberous structural layer is finished to a uniform annular shaped surface, preferably by grinding or other similar lathe turning operations. The first mentioned fiberous structural layer is formed on a mandrel against end flanges which project radially therefrom, then the end flanges are moved away from the formed flanges of the first resinous and fiberous structural layer. The second structural layer is formed over the finished foam structure and on the outsides of the flanges of the first resin and fiberous structural layer so as to encapsulate the foam structure and so as to create a bond relative to the fiberous and structural layers with the foam structure to provide an overall light weight hollow cylindrical collector electrode for electrostatic precipitators.

Another feature of the method is to encapsulate mounting blocks in the foam structure which occurs at a time when the first structural layer is on the mandrel and preliminary to the placement of the foam structure forming material on the first structural layer.

The specific method steps for forming each of the resin and fiberous structural layers comprising the forming of a first resin and fiberous layer; then wrapping a spiral form of woven fiberous material around the first fiberous and resin layer; then forming a second fiberous and resinous layer around the spiral wrap layer; and then applying at least one resinous bonding corrosion resistant veil to the last mentioned fiberous and resinous layer. Thus, each of the aforementioned fiberous and structural layers comprises at least three layers of fiberous and resinous material, including two layers with a third layer of spiral wrapped woven fabric therebetween.

Accordingly, the method of the invention provides for the production of very strong light weight hollow cylindrical collector electrodes having spaced apart inner and outer annular walls connected together by a structural foam layer and having upper and lower ends which are provided with overlapping flange portions of the first and second fiberous structural layers aforementioned, so as to provide a very strong and properly sealed and encapsulated relationship of the foam structure internally of the inner and outer walls of the hollow cylindrical structure produced in accordance with the method of the invention.

Accordingly, it is an object of the present invention to provide an efficient method for producing hollow cylindrical light weight structures.

Another object of the invention is to provide a method for producing light weight hollow cylindrical collector electrode structures for electrostatic precipitators.

Another object of the invention is to provide a novel method for producing hollow cylindrical structures which comprises lathe turning of a mandrel on which first and second structural layers are formed successively; the first one being on the mandrel and the second layer being a structural foam layer which is externally machined by a lathe operation, and the third layer being fiberous structural layer formed on the machined surface of the foam structural layer.

Another object of the invention is to provide a novel means for carrying out the method which includes a lathe structure having a collapsible mandrel with opposite end flanges which are moveable.

Another object of the invention is to provide a novel method for producing hollow cylindrical structures including internal and external fiberous resinous layers with foam structure therebetween and wherein each of the fiberous and resin layers are structural layers and comprise at least three layers of fiberous and strufural material and an intermediate one of which is spirally wrapped woven fabric structure bonded by means of a suitable resin.

Another object of the invention is to provide a novel hollow cylindrical structure which is a product of the method of the invention.

Further objects and advantages of the invention may be apparent from the following specification, appended claims and accompanying drawings.

BRIEF DESCRIPTION OF THE DRAWINGS

FIG. 4 is an enlarged fragmentary sectional view of a portion of the mandrel of the lathe structure shown in FIG. 1 and illustrating steps of the method of the invention for producing a first structural layer and a foam structural layer on the aforementioned mandrel;

FIG. 5 is a view similar to FIG. 4 but showing the end flanges of the mandrel of the lathe in FIG. 1 removed and showing a succeeding step beyond that shown in FIG. 4 wherein an outside structural layer is overlapped and bonded onto the first structural layer and which provides for encapsulation of the structure of the cylindrical structure;

FIG. 6 is an enlarged fragmentary sectional view of the cylindrical structure shown in FIG. 5;

FIG. 7 is an enlarged fragmentary sectional view taken from the line 7—7 of FIG. 6;

FIG. 8 is a perspective view of one of the hollow cylindrical structures produced in accordance with the method of the invention;

FIG. 9 is a fragmentary sectional view taken from the line 9—9 of FIG. 6 showing a spirally wrapped layer of woven fiberous material applied in accordance with the method of the invention;

FIG. 10 is an enlarged fragmentary sectional view of a mounting block structure mounted in an end of the cylindrical structures produced in accordance with the method and showing the structure on substantially the same plane as that shown in FIG. 5; and FIG. 11 is an enlarged fragmentary view of a cylindrical structure produced in accordance with the invention and showing portions thereof broken away and in section to amplify the illustration.

DESCRIPTION OF THE PREFERRED EMBODIMENTS

Figure 1:
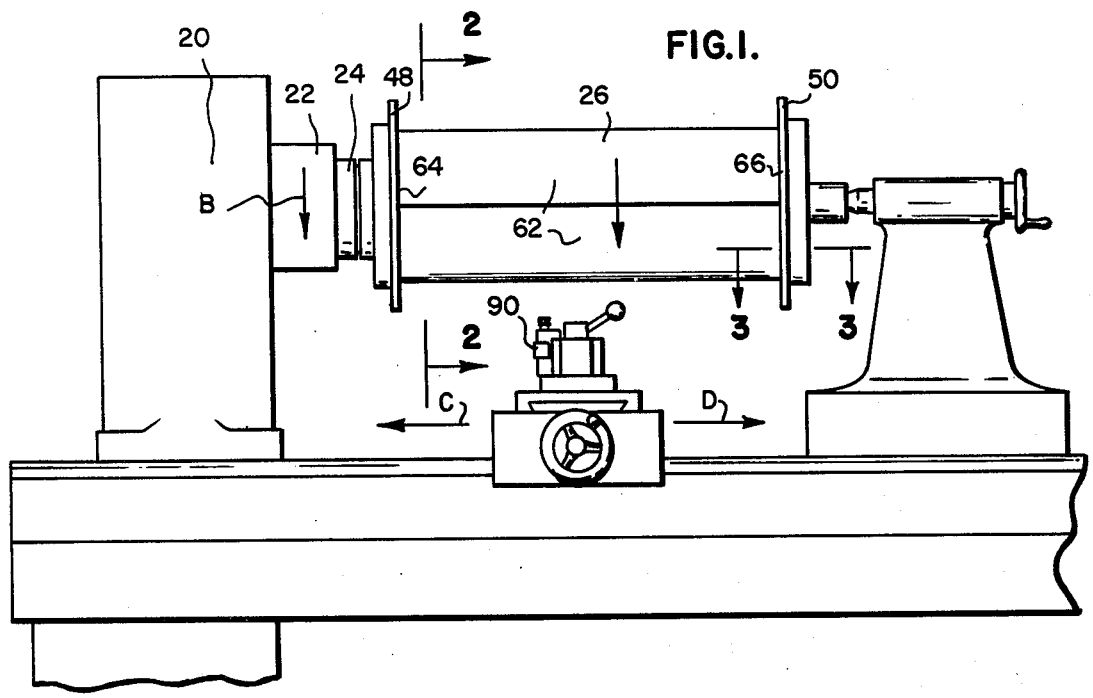
FIG. 1 is a side elevational view of a novel lathe structure particularly adapted for use in carrying out the method of the invention for producing hollow cylindrical structures.
Figure 2:
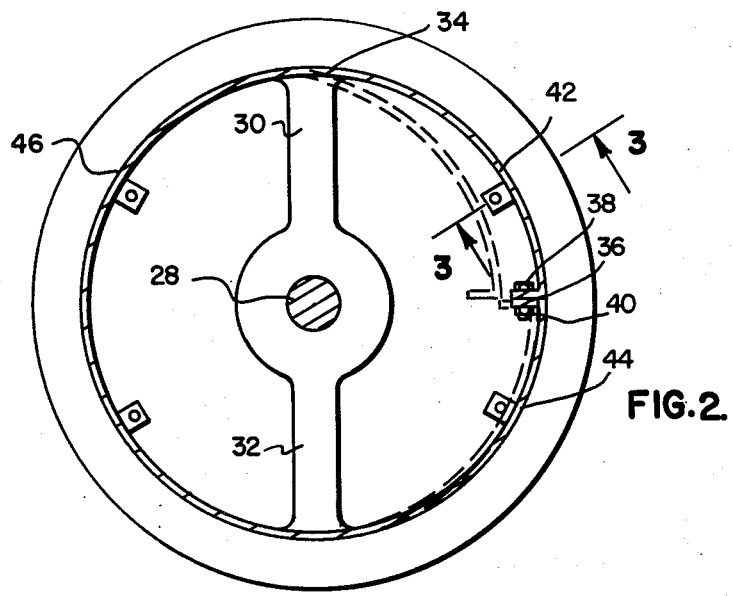
FIG. 2 is an enlarged sectional view taken from the line 2—2 of FIG. 1 showing radially collapsible structure of the mandrel of the lathe structure shown in FIG. 1.
Figure 3:
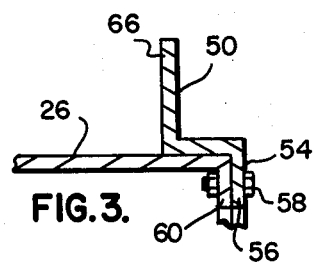
FIG. 3 is an enlarged fragmentary sectional view taken from the line 3—3 of FIG. 1 showing a moveable end flanges of the mandrel of the lathe structure shown in FIG. 1.

FIGS. 1 to 5 inclusive disclose features of a lathe type mechanism in connection with which the method of the invention is carried out. This lathe type mechanism is provided with a usual head stock 20 having a rotating spindle 22 and a chuck 24 which rotates a cylindrical mandrel 26; the cross section of which is as shown in FIG. 2 of the drawings. This mandrel is provided with a central shaft 28 which may be engaged by the chuck 24 and connected with the shaft by means of radially disposed arm structures 30 and 32 is a cylindrical mandrel structure 34 having opposite ends 36 and 38 connected together by bolts 40, such that when the bolts 40 are removed, the adjacent portions 42 and 44 of the mandrel may be collapsed inward as shown by broken lines in FIG. 2. The bolts 40 when removed allow the adjacent ends to collapse inwardly and slightly overlap so as to permit the release of hollow cylindrical resinous and fiberous structures from the periphery 46 of the mandrel 26.

This mandrel 26 is provided with removeable radially extending end flanges 48 and 50 which are shown on enlarged scale in FIGS. 4 and 5; the flanges 50 being similar to the flange 48 is disclosed in FIG. 4 and will be described in detail.

The flange 50 shown in FIG. 4 is provided with an offset portion 52 which extends over an end 54 of the mandrel structure 26 and a radially and inwardly extending flange 56 of the offset portion 52 is connected by means of bolts 58 to end flange structure 60 of the hollow cylindrical mandrel 26. When the bolts 58 are removed, the flange 50 may be moved away from the end 54 of the mandrel 26 as indicated by an arrow A in FIG. 4 of the drawings. After the end flanges 48 and 50 are thus removed, a step of the method may be carried on in connection with the periphery of the mandrel 26 as shown in FIG. 5 and as will be hereinafter described in detail.

The method of the invention is particularly adapted for use in producing large light weight hollow cylindrical structures which are quite accurate from the standpoint of annular concentricity and cylindrical uniformity.

In generaly, the method of the invention is practiced as follows:

The mandrel 26 is provided with a peripheral surface 62 which is annular and smooth and uniform. The flange structures 48 and 50 are provided with inner surfaces 64 and 66 as shown best in FIGS. 1 and 4 of the drawings.

As shown in FIG. 4 of the drawings, a first resin and structural material is designated 68 and is formed on the peripheral surface 62 of the mandrel 26. This is done by applying chopped glass, fabric, or other fiberous material such as carbon fiber, and resin onto the surface 62 and also onto the surfaces 64 and 66 of the removeable flanges 48 and 50. With reference to FIG. 4, it will be seen that the first resin and fiberous structural layer is provided with a cylindrical portion 70 and a radially extending flange 72 formed against the mandrel 26 and the inner surface 66 of the removeable flange 50. Likewise, a similar flange is formed adjacent the surface 64 of the flange 48, thus integral with the structural layer 70 is the flange 72 and a similar flange formed adjacent the mandrel flange 48. At this time, blocks of resinous material designated 74 are bonded to inner surfaces of the flange 72; the inner surface being designated 76 in FIG. 4 and these mounting blocks 74, as will be hereinafter described, serve to provide for the mounting of the hollow cylindrical structures produced in accordance with the present invention.

After these blocks 74 have been bonded into place, as shown in FIG. 4 of the drawings, a foam structure forming resin is sprayed onto the outer surface 78 of the structural layer 70 and onto the inner surface 76 of the flange 72 surrounding the mounting blocks 74 and this foam structure forming resin is designated 80 and cures and bonds to the surfaces 76 and 78 and around the blocks 74 and the exterior thereof may be of an irregular surface such as shown by broken lines 82 which may extend beyond peripheral limits 84 of the flange 72 and the opposite flange adjacent the mandrel flange 48, as hereinbefore described.

The mandrel flanges 48 and 50 are then removed by removing the bolts such as the bolts 58 shown in FIG. 4 of the drawings and leaving the end flanges 72 of the structural layer 70 with an overlay of the resin foam structure as indicated by broken lines 82 in FIG. 4 of the drawings. The mandrel 26, together with the hollow cylindrical structural layer 70 and the foam structure layer 80 are then rotated in the direction of the arrow B in FIG. 1 of the drawings and a conventional belt sander or grinder or suitable turning tool is secured to the conventional tool post structure 90 of the machine shown in FIG. 1 of the drawings and this provides for a generally well known lathe turning operation which finishes the foam structural layer to a uniform peripheral smooth annular surface designated 92 in FIG. 4 of the drawings and thereby cutting away the surplus foam structure indicated by the broken lines 82 in FIG. 4 of the drawings.

The next step of the method is disclosed in FIG. 5 wherein a second structural layer of resin and fiberous material designated 94 is applied to the machined surface 92 of the foam structural layer and in addition, overlapping end flange structure 96 is applied by spraying onto an outer surface 98 of the flange structure 72 of the first structural layer shown in FIG. 4 of the drawings. Thus, the end flange structure 98 overlaps the flange structure 72 and is bonded thereto so as to encapsulate the foam structural layer 80 between the first and second structural layers 70 and 94.

It will be seen that the resin and fiberous structural layer 94 and its flange 96 may have slightly uneven surfaces indicated generally by broken lines 100 which are subsequently machined away to smooth surfaces by rotating the mandrel 26 and applying the usual lathe turning functions by means of a tool, grinder or sander carried on the tool post 90 and with the tool post 90 being capable of traversing the lathe bed in directions of the arrows C and D as desired.

Thus, the structural layer 94 is machined to an accurate peripheral annular surface 104 as shown in FIG. 5 of the drawings and the method steps following this are disclosed more in detail in FIG. 6 of the drawings which is devoted to the detailed disclosure of the structure of each of the structural layers 70 and 94.

With reference to FIGS. 6 and 7 of the drawings, it will be seen that the structural layers 70 and 94 each comprise several laminations of material which include corrosion resistant veils which form surfaces of the cylindrical structures of the invention which may be wet wall collector electrode surfaces of an electrostatic precipitator on which water and various corrosion inducing materials flow.

The structural layer 70, as shown in FIG. 6, comprises several laminations of material; the first lamination being designated 104 which is wrapped around the mandrel 26 in a spiral pattern such as shown in FIG. 9 of the drawings. The lamination 104 serves as a corrosion resistant veil and is composed of a high tinsel flexible fabric material and a resin such that the resin impregnates the fabric material. The resin and fabric material are applied directly to the external surface 62 of the mandrel 26 which has previously been provided with a release agent.

The material of the resinous and fabric lamination 104 is preferably a vinylester material such as the resin known as Derakane 411, produced by Dow Chemical, and the accompanying fabric material may be such fabric material known as "Nexus", producec by General Mills. Additionally, another equivalent fabric may be of material such as dynel which is also wrapped in spiral form around the mandrel 26 in a geometrical pattern such as shown in FIG. 9 of the drawings. These fabric materials are preferably in strips, as for example approximately six inches wide, and as they are wrapped in spiral form, they are saturated by a vinylester resin which, together with the fabric material form a very strong structural layer which is highly resistant to various corrosion materials which may be carried by water flowing down the surfaces of the cylindrical structures of the invention when such are used in an electrostatic precipitated environment, particularly as collector electrodes.

With reference to FIG. 6, a second lamination 109 is similar to the lamination 104 and is applied in the same manner over the lamination 104 and comprises the same materials as used in producing the lamination 104.

Following the spiral wrap formation of the second corrosion resistant veil structure 109, a fiberglass and resin layer 112 is applied to the surface of the veil lamination 109. This lamination 112 is a relatively thick structural layer and consists of chopped fiberglass and resin; the resin and fiberglass being sprayed onto the veil lamination 109. This relatively thick lamination or layer 112 is basically a stress resisting structural layer to provide a strong backing for the veil layers 104 and 109 and also to provide for rigidity of the cylindrical structures in which this layer 112 is used. The resin used to form the chopped fiberglass layer 112 is preferably a vinylester resin similar to that hereinbefore described.

As hereinbefore described, the veil layers 104 and 109 respectively and the structural layer 112 are formed adjacent to the end flange structures of the mandrel 26 and, at this time, mounting blocks, such as the mounting blocks 74, are bonded to the flanges 72 shown in FIG. 4. These flanges include all of the layers of laminations of the veil materials 104, 109 and the structural fiberglass layer 112, shown in FIG. 6 of the drawings. The blocks 74 are bonded by means of the aforementioned vinylester resin.

After the blocks 74 are so bonded to the flanges 72, the foam structure forming resin designated 80 is sprayed onto the structural lamination or layer 112, as hereinbefore described. This foam structure forming resin is preferably a closed cell polyurethane resin, as for example this resin has a density of one and a half to three pounds per cubic foot.

After this polyurethane resin foam has set up and has been machined to the periphery 92, hereinbefore described, the resin and fiberous structural layer 94 is formed in a similar manner to the resin and fiberous structural layer 70 disclosed in FIG. 6 of the drawings with a fiberglass layer 114 bonded to the foam structure 80.

This fiberglass structural layer 114 is formed in a similar manner to the hereinbefore described structural layer 112 and the periphery 115 of this structural layer 114 is carefully ground and finished to an accurate and smooth cylindrical surface by the foregoing grinding methods as hereinbefore described. A spiral wrap veil layer or lamination 117 is then applied in a manner similar to the application of the hereinbefore described veil lamination 104 and comprises the same materials. A second veil layer or lamination 119 is applied then to the outer side of the layer 117 and this veil lamination or layer is similar to the veil lamination or layer 117.

It will be seen that an outer surface 121 of the veil lamination 119 forms a convex exterior of the cylindrical structure of the invention, while an inner convex surface 123 of the veil layer or lamination 104 forms a concave inner wall surface or bore surface of the hollow cylindrical structure of the invention.

It will be noted that several veil wrappings may be applied depending on the corrosion resistance required.

The corrosion resistant skin or veil laminations are provided with external surfaces 121 and 123 which are initially glossy and these glossy surfaces are finished by abrasive materials at an angle of approximately 45 degrees as inciated by lines 120 in FIG. 8 of the drawings, both on the exterior surface 121 and the interior surface 123 of the cylindrical structure are so finished such that the cylindrical structure may subsequently be used as an electrostatic precipitator collector electrode cylinder as shown in FIG. 11 wherein the cylinder comprises an upper annular edge 122 on which a water distributor may rest but which is no part of the present invention. Such water distributors cause water to flow on inner annular surfaces 123 and outer annular surfaces 121 of the cylinder which have previously been abraded by fine abrasive material at an angle according to the lines 120. This breaks up surface tension on the surfaces 124 and 126 and also provides for lateral distribution of the flow so that there will be no horizontal flow separation of water passing downwardly as indicated by the arrows 124 and 126 on the inner and outer surfaces of the collector electrodes, such as shown in FIG. 11.

It will be understood that the corrosion resistant veil laminations 104, 109, 117 and 119 are extremely important on the surfaces of collector electrodes of electrostatic precipitators in order to avoid or prevent the rapid breakdown of the structures of the electrodes when under the influence of high voltage discharge to water on the veil surfaces and the presence of highly corrosive materials which are electrostatically attracted to and collected in water on said veil surfaces. The electrolitic effects of such high voltage and various highly corrosive materials, including acids and other corrosive materials, collected in the water on the surfaces of the aforementioned veils.

The cylindrical structure, such as shown in FIG. 11, is placed with the mounting blocks 74 at the normally lower end thereof and, as shown in FIG. 10 of the drawings, bolt receiving holes 128 are drilled in the blocks 74 and are provided with internal screwthreads 130 which extend through the end flanges 96 and 72 of the respective resin and fibrous structural layers 94 and 70 respectively. The internally screwthreaded holes 130 are adapted to receive bolts for securing the lower end or edge 132 of the hollow cylindrical structure 134 on a suitable base as desired.

It will be obvious to those skilled in the art that various modifications may be resorted to without departing from the spirit of the invention.

We claim:

1. A method for producing hollow cylindrical collector electrodes for electrostatic precipitators comrpising: forming and curing a first hollow cylindrical resin and fibrous structural layer on a convex annular surface of a cylindrical mandrel which is provided with radially extending moveable end flanges and forming said first structural layer also on said moveable end flanges to provide first radially extending flanges integral with opposite ends of said first hollow cylindrical layer; then spraying a foam structure forming resin on said first resin and fibrous structural layer and between said first radially extending flanges and permitting said foam structure forming resin to form into foam structure and to bond to and cure on said first resin and fibrous structural layer and bond onto said first radially extending flanges; then lathe turning said mandrel and machining the exterior of said foam structure to an accurate cylindrical shape and to form said exterior to a uniform annular shaped surface; then moving said moveable end flanges away from said first radially extending flanges; then forming and bonding a second resin and fibrous hollow cylindrical structural layer on said annular shaped surface of said foam structure and forming second radially extending flanges integral with opposite ends of said second hollow cylindrical structural layer such that said second radially extending flanges overlap and bond to outer sides of said first radially extending flanges of said first hollow cylindrical layer thereby encapsulating said foam structure; and finishing the exterior of said second resin and fibrous structural layer to a uniform annular shaped surface.

2. The invention as defined in claim 1, wherein: mounting blocks are bonded to one end of said first hollow cylindrical resin and fibrous structural layer before said foam structure forming resin is applied thereto.

3. The invention as defined in claim 1, wherein: said mandrel is then collapsed and said cylindrical structure is released therefrom.

4. A method for producing hollow cylindrical collector electrodes for electrostatic precipitators comprising: forming and curing a first hollow cylindrical resin and fiberous structural layer on a convex annular surface of a cylindrical mandrel which is provided with radially extending moveable end flanges and forming said first structural layer also on said moveable end flanges to provide first radially extending flanges integral with opposite ends of said first hollow cylindrical layer; then spraying a foam structure forming resin on said first resin and fibrous structural layer and between said first radially extending flanges and permitting said foam structure forming resin to form into foam structure and to bond to and cure on said first resin and fibrous structural layer and to bond onto said first radially extending flanges; then lathe turning said mandrel and machining the exterior of said foam structure to an accurate cylindrical shape and to form said exterior to a uniform annular shaped surface; then moving said moveable end flanges away from said first radially extending flanges; then forming and bonding a second resin and fiberous hollow cylindrical structural layer on said annular shaped surface of said foam structure and forming second radially extending flanges integral with opposite ends of said second hollow cylindrical structural layer such that said second radially extending flanges overlap and bond to outer sides of said first radially extending flanges of said first hollow cylindrical layer thereby ancapsulating said foam structure; and finishing the exterior of said second resin and fibrous structural layer to a uniform annular shaped surface.

* * * * *